(12) United States Patent
Ishikawa et al.

(10) Patent No.: US 12,007,642 B2
(45) Date of Patent: Jun. 11, 2024

(54) DISPLAY DEVICE

(71) Applicant: Japan Display Inc., Tokyo (JP)

(72) Inventors: Tomokazu Ishikawa, Tokyo (JP); Yuki Kuramoto, Tokyo (JP); Haruki Yamada, Tokyo (JP); Katsuhiro Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/311,923

(22) Filed: May 4, 2023

(65) Prior Publication Data

US 2023/0273475 A1 Aug. 31, 2023

Related U.S. Application Data

(63) Continuation of application No. 17/735,716, filed on May 3, 2022, now Pat. No. 11,681,177, which is a
(Continued)

(30) Foreign Application Priority Data

Apr. 16, 2015 (JP) .................. 2015-084208

(51) Int. Cl.
  *G02F 1/1335* (2006.01)
  *G02F 1/1333* (2006.01)
  *G02F 1/1339* (2006.01)

(52) U.S. Cl.
CPC .. *G02F 1/133512* (2013.01); *G02F 1/133308* (2013.01); *G02F 1/133528* (2013.01);
(Continued)

(58) Field of Classification Search
CPC .......... G02F 1/13338; G02F 1/133512; G02F 1/133514; G02F 1/13394; G02F 1/13396
See application file for complete search history.

(56) References Cited

U.S. PATENT DOCUMENTS 10,684,503 B2 * 6/2020 Ishikawa ........... G02F 1/133528
10,908,451 B2 2/2021 Ishikawa et al.
(Continued)

FOREIGN PATENT DOCUMENTS

| CN | 101387769 A | 3/2009 |
| JP | 09-211473 A | 8/1997 |

(Continued)

OTHER PUBLICATIONS

Office Action dated Sep. 25, 2018, in Japanese Patent Application No. 2015-084208, filed Apr. 16, 2015, with English-language Translation, citing documents FP Nos. 1-8 on p. 1 of 2 and FP Nos. 1-4 on p. 2 of 2.
(Continued)

*Primary Examiner* — Jessica M Merlin
(74) *Attorney, Agent, or Firm* — Maier & Maier, PLLC

(57) ABSTRACT

According to one embodiment, a display device comprises a display panel and a polarizing plate. The display panel comprises a display area, a non-display area surrounding the display area, and a light-shielding layer arranged in the display area and the non-display area. The polarizing plate is provided on a surface of the display panel, and including an end portion located in the non-display area. In this display device, the light-shielding layer opposite to the end portion of the polarizing plate is at least partially removed.

14 Claims, 14 Drawing Sheets

Related U.S. Application Data continuation of application No. 17/135,205, filed on Dec. 28, 2020, now Pat. No. 11,353,736, which is a continuation of application No. 16/875,144, filed on May 15, 2020, now Pat. No. 10,908,451, which is a continuation of application No. 16/159,120, filed on Oct. 12, 2018, now Pat. No. 10,684,503, which is a continuation of application No. 15/089,656, filed on Apr. 4, 2016, now Pat. No. 10,133,113.

(52) U.S. Cl.
CPC .... *G02F 1/13394* (2013.01); *G02F 1/133331* (2021.01); *G02F 1/13338* (2013.01); *G02F 1/13396* (2021.01); *G02F 2202/28* (2013.01)

(56) References Cited

U.S. PATENT DOCUMENTS

| | | |
|---|---|---|
| 2004/0201787 A1 | 10/2004 | Sekiguchi et al. |
| 2011/0183451 A1 | 7/2011 | Tanaka et al. |
| 2012/0099061 A1 | 4/2012 | Lee |
| 2013/0127776 A1 | 5/2013 | Guard et al. |
| 2014/0049453 A1 | 2/2014 | Lee et al. |
| 2015/0301417 A1 | 10/2015 | Park et al. |

FOREIGN PATENT DOCUMENTS

| | | |
|---|---|---|
| JP | 2005099221 A | 4/2005 |
| JP | 2007004111 A | 1/2007 |
| JP | 2007304273 A | 11/2007 |
| JP | 2008107488 A | 5/2008 |
| JP | 2009069321 A | 4/2009 |
| JP | 2009192792 A | 8/2009 |
| JP | 2010072368 A | 4/2010 |
| JP | 2012173483 A | 9/2012 |
| JP | 201315740 A | 1/2013 |
| JP | 2014145992 A | 8/2014 |
| JP | 2014235185 A | 12/2014 |
| KR | 1020080088935 A | 10/2008 |
| WO | 2014084040 A1 | 6/2014 |

OTHER PUBLICATIONS

Combined Chinese Office Action and Search Report dated Nov. 28, 2018 in Chinese Patent Application No. 201610236824.8 (with partial unedited computer generated English translation), citing document FP No. 9 therein, 10 pages.

* cited by examiner

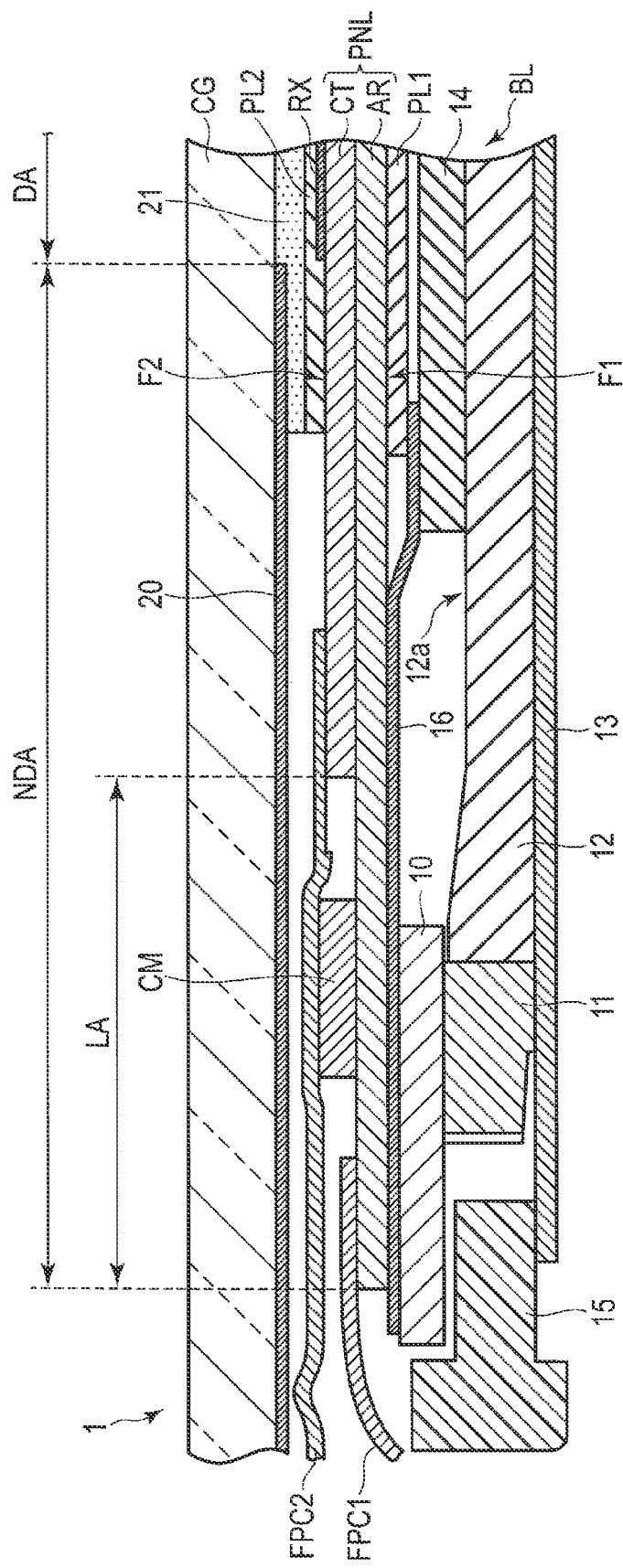
F I G. 1

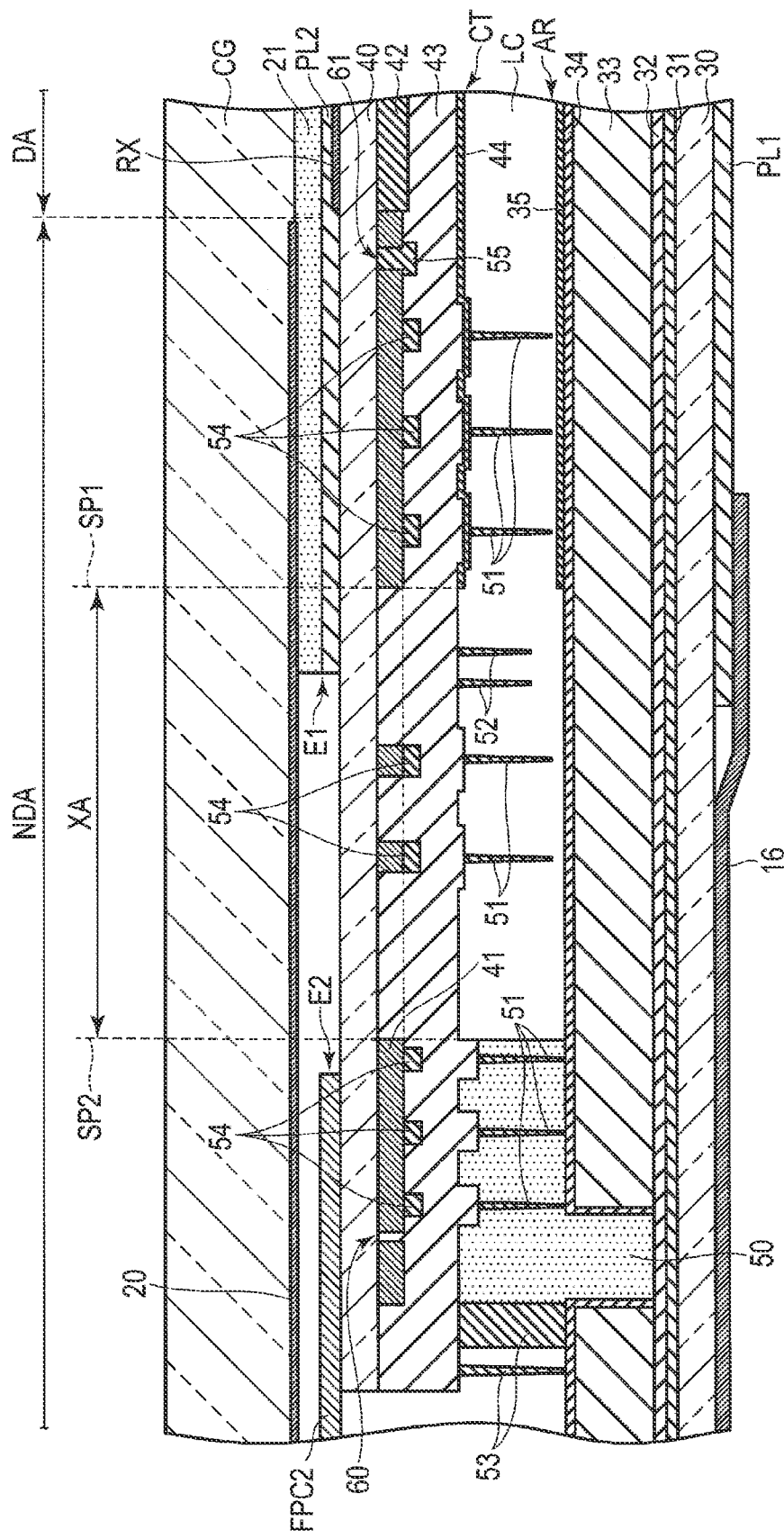
F I G. 2

ABSTRACT# DISPLAY DEVICE

CROSS-REFERENCE TO RELATED APPLICATIONS

This application is a continuation of U.S. application Ser. No. 17/735,716 filed May 3, 2022, which is a continuation of U.S. application Ser. No. 17/135,205 filed Dec. 28, 2020, which is a continuation of U.S. application Ser. No. 16/875,144 filed May 15, 2020, which is a continuation of U.S. application Ser. No. 16/159,120 filed Oct. 12, 2018, which is a continuation of U.S. application Ser. No. 15/089,656 filed Apr. 4, 2016, and is based upon and claims the benefit of priority from Japanese Patent Application No. 2015-084208, filed Apr. 16, 2015, the entire contents of each of which are incorporated herein by reference.

FIELD

Embodiments described herein relate generally to a display device.

BACKGROUND

Display devices such as liquid crystal display devices include a display panel provided with a display element, and a polarizing plate provided on a main surface of the display panel. In such a display device, in the case of providing a cover member such as a cover glass, resin is applied which is cured by, for example, ultraviolet light. To be more specific, a surface of the polarizing plate is coated with resin; the cover member is then provided on the polarizing plate; ultraviolet light is radiated onto the resin through a display panel and the cover member, thereby curing the resin to attach the display panel and the cover member to each other.

If the resin is still not cured and is in contact with an end portion of the polarizing plate, there is a case where the end portion of the polarizing plate is swollen by the resin. In this case, if it is swollen to a great degree, it can cause deformation of the display panel, and influence the display quality.

In general, the end portion of the polarizing plate is provided in a non-display area (also referred to as a frame edge area or the like) located outward of a display area. The non-display area is shielded against light by a light shielding layer formed in the cover member and the display panel. Therefore, there can be a case where ultraviolet light is blocked by the light shielding layer, and thus the resin cannot be sufficiently cured.

BRIEF DESCRIPTION OF THE DRAWINGS

FIG. 1 is a cross-sectional view schematically showing a configuration of an end portion of a display device according to one embodiment and a neighboring portion close to the end portion.

FIG. 2 is an enlarged view showing cross sections of a cover glass and a display panel provided in the display device.

DETAILED DESCRIPTION

Figure 3:
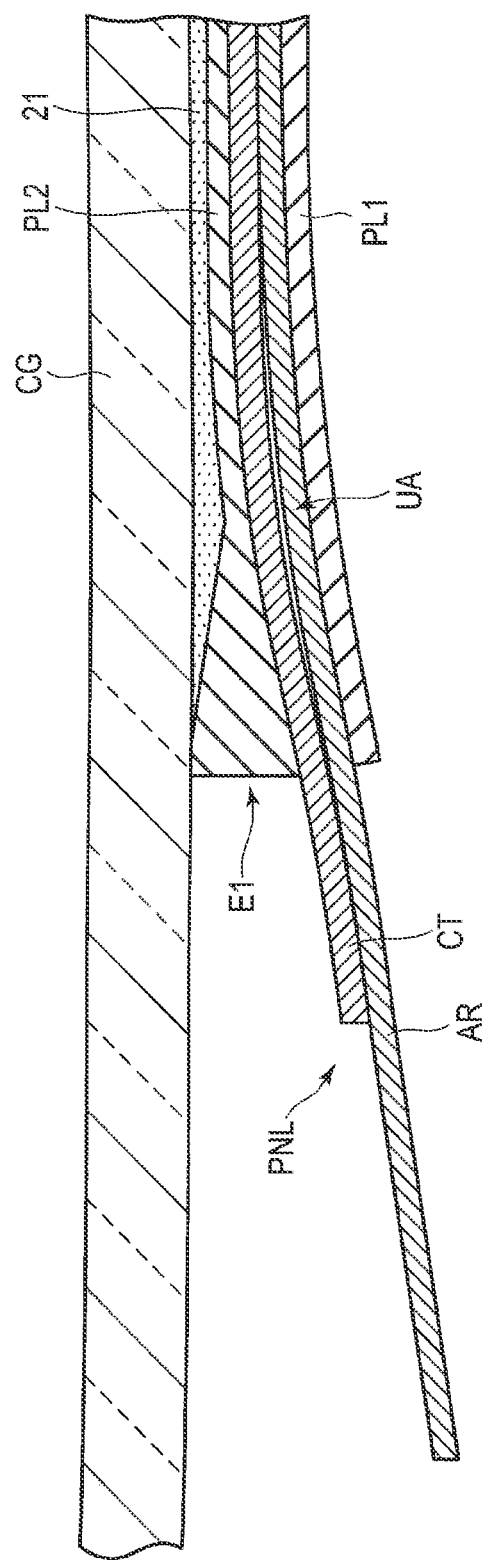
FIG. 3 is a cross-sectional view schematically showing a swollen end portion of a second polarizing plate provided in the display device.

In general, according to one embodiment, a display device comprises a display panel and a polarizing plate. The display panel comprises a display area, a non-display area surrounding the display area, and a light-shielding layer arranged in the display area and the non-display area. The polarizing plate is provided on a surface of the display panel, and including an end portion located in the non-display area. In this display device, the light-shielding layer opposite to the end portion of the polarizing plate is at least partially removed.

Embodiments will be explained with reference to accompanying drawings.

The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In some cases, in each of the drawings, reference numbers of identical or similar elements, which are successively disposed, are omitted. In the specification and drawings, after structural elements are each explained once with reference to any of the drawings, there is a case where their explanations will be omitted as appropriate, and those identical to or similar to the explained structural elements will be denoted by the same reference numbers, respectively, as the explained structural elements.

With respect to each of the embodiments, a display device provided with a transmissive display panel employing a liquid crystal display element will be described as an example of a display device. Such a display device can be applied to, for example, various devices and apparatuses such as a smartphone, a tablet terminal, a mobile telephone terminal, a personal computer, a television receiver, a vehicle-mounted device, and a game console. It should be noted that main structural elements disclosed with respect to each of the embodiments can also be applied to a reflective display device and a display device having both functions of transmissive and reflective display devices. Furthermore, the display panel provided in the display device is not limited to the display panel employing the liquid crystal display element; that is, as the display panel, display panels including different kinds of display elements, such as a self-luminous display panel including an organic electroluminescent display element or the like, and an electronic paper display panel including an electrophoresis element or the like, can be applied.

FIG. 1 is a cross-sectional view schematically showing a configuration of an end portion of a display device 1 according to one embodiment and a neighboring portion close to the end portion. The display device 1 as shown in FIG. 1 comprises a display panel PNL, a backlight BL and a cover glass CG.

The display panel PNL comprises an array substrate AR, a counter-substrate CT located opposite to the array substrate AR, and a liquid crystal layer (a liquid crystal layer LC to be described later) held between the array substrate AR and the counter-substrate CT. The array substrate AR is an example of a first substrate, and the counter-substrate CT is an example of a second substrate. Also, the liquid crystal display panel PNL includes a display area DA provided to display an image, and a non-display area NDA surrounding the display area DA. The display area DA can also be referred to as an active area. The non-display area NDA can also be referred to as a frame area, a peripheral area or the like.

The display area DA is, for example, rectangular, and the non-display area NDA is formed in the shape of a rectangular frame surrounding the display area DA. Of the four sides of the array substrate AR and the four sides of the counter-substrate CT, three sides of the array substrate AR are substantially aligned with three sides of the counter-substrate CT, and the other side of the array substrate AR is further projected than the other side of the counter-substrate CT. The cross-sectional view of FIG. 1 show cross sections of the above other sides of the array substrate AR and the counter-substrate CT and neighboring portions close to the other sides of those substrates. Part of the array substrate AR which is further projected than the counter-substrate CT will be hereinafter referred to as a terminal area LA. In the terminal area LA, lines are formed which are connected to scanning and signal lines included in the array substrate AR and a circuit which drives the scanning and signal lines, etc. Also, in the terminal area LA, terminals connected to the above lines are provided. To the terminals, a first flexible printed circuit FPC 1, etc., are connected, the first flexible printed circuit FPC 1 being provided to be connected to a main board of an apparatus on which the display device 1 is to be mounted, or the like. Furthermore, in the terminal area LA, a driver CM formed of a semiconductor chip or the like which supplies a signal to the above lines is mounted.

The backlight BL comprises a printed circuit 10, light-emitting elements 11, a light guide plate 12, a reflective sheet 13, a group of optical elements 14, a support frame 15 and a shade tape 16. The light-emitting elements 11 are, for example, light-emitting diodes, and mounted on the printed circuit 10. A light-emitting surface of each of the light-emitting elements 11 is provided to face an end portion (light incidence surface) of the light guide plate 12.

The light guide plate 12 includes a plate emission surface (light emission surface) 12a, which is located opposite to a first main surface F1 of the display panel PNL (an outer surface of the array substrate AR). Light from the light-emitting elements 11 propagates in the light guide plate 12, and is emitted from the emission surface 12a. The reflective sheet 13 is provided on a reverse surface of the light guide plate 12 (which is opposite to the emission surface 12a), and reflects light emitted from the reverse surface of the light guide plate 12 back to the light guide plate 12. The group of optical elements 14 are provided between the emission surface 12a of the light guide plate 12 and the display panel PNL, and include diffusion sheets and prism sheets which are successively arranged from, for example, an emission-surface side where the emission surface 12a is located.

The support frame 15 is formed in the shape of, for example, a frame surrounding the light-emitting elements 11 and the light guide plate 12, and supports elements of the backlight BL such as the light-emitting elements 11 and the light guide plate 12. The shade tape 16 is provided opposite to the non-display area NDA, and may be formed in the shape of a frame surrounding the display area DA. The shade tape 16 is attached to, for example, the group of optical elements 14 and the printed circuit 10, and blocks light from the light-emitting element 11 and the light guide plate 12. Also, the shade tape 16 is attached to the array substrate AR and a first polarizing plate PL1, and the group of optical elements 14 and the printed circuit 10 are fixed to the array substrate AR and the first polarizing plate PL1. Furthermore, the shade tape 16 may be attached to the support frame 15. Such a shade tape 16 is an example of a light shielding member for preventing light, which does not contribute to a display made by light from the backlight BL, from reaching the display panel PNL.

The cover glass CG is provided opposite to a second main surface F2 of the display panel PNL (an outer surface of the counter-substrate CT). The cover glass CG has greater dimensions than, for example, those of the display panel PNL, and covers the entire surface of the display panel PNL. Such a cover glass CG is an example of a cover member forming an outer surface of the display device 1.

The cover glass CG includes a first light shielding layer 20 which is located opposite to the display panel PNL. The first light shielding layer 20 is formed by printing, for example, blacking having a light-shielding effect, on the cover glass CG, and also formed in the shape of a frame which is open in such a way as to correspond to the display area DA. The first light shielding layer 20 prevents the non-display area NDA from being visibly recognized from the outside of the cover glass CG, and also light emitted from the light-emitting element 11 or the light guide plate 12 from leaking from the non-display area NDA.

The display device 1 further comprises the first polarizing plate PL1 having a first polarizing axis and a second polarizing plate PL2 having a second polarizing axis perpendicular to the first polarizing axis. The first polarizing plate PL1 is provided between the array substrate AR and the backlight BL. The second polarizing plate PL2 is provided between the counter-substrate CT and the cover glass CG.

The first polarizing plate PL1 and the second polarizing plate PL2 are formed, for example, rectangular, and opposite to the entire surface of the display area DA. The first and second polarizing plates PL1 and PL2 overlap with the non-display area NDA at their end portions as seen in plan view.

The cover glass CG is located opposite to the second polarizing plate PL2. Between the cover glass CG and the second polarizing plate PL2, an adhesive layer 21 is formed. Thus, the cover glass CG and the second polarizing plate PL2 are adhered to each other by the adhesive layer 21.

The adhesive layer 21 is formed of ultraviolet curable resin such as epoxy resin or acrylic resin, which is cured when irradiated with ultraviolet light. The adhesive layer 21 and the second polarizing plate PL2 overlap with the shade tape 16 and the first light shielding layer 20 at their end portions as seen in plan view. In the example shown in FIG. 1, end portions of the adhesive layer 21 and the second polarizing plate PL2 are aligned with each other; however, the end portion of the adhesive layer 21 may be projected toward the terminal area LA with respect to the end portion of the second polarizing plate PL2.

The display device 1 includes a touch panel for detecting an object which is close to or in contact with the cover glass CG. As the touch panel included in the display device, various types of touch panels are present. In the above embodiment, the display panel PNL is formed to have functions of the touch panel. In the example shown in FIG. 1, detection electrodes RX for detecting proximity or contact of an object are formed on the second main surface F2 of the display panel PNL. For example, the detection electrodes RX can be formed of transparent material such as indium tin oxide (ITO) or thin metal wire. As a drive electrode to be used along with the detection electrodes RX, for example, a common electrode for driving pixels, which is provided in the array substrate AR, can be also used. However, the drive electrode may be provided on the second main surface F2 or the like, separate from the common electrode, and its position and shape are not especially limited.

The potential of a detection electrode RX is changed by the influence of a capacitance between the detection electrode RX and an object which is in proximity to or contact with the cover glass CG. Therefore, based on the potential (detection signal), it is possible to detect whether an object being in proximity to or contact with the cover glass CG is present or absent, and also detect the position of the object if the object is present. It should be noted that the method of detecting an object is not limited to the above method. For example, it is possible to adopt a method of detecting an object based on the variation of the self-capacitance of the detection electrode RX.

The display device 1 further comprises a second flexible printed circuit FPC2 electrically connected to the detection electrodes RX. For example, to an end portion of the counter-substrate CT, terminals connected to the detection electrodes RX are provided, and the second flexible printed circuit FPC2 are connected to the terminals. In the example shown in FIG. 1, the terminals are provided at the second main surface F2, and the second flexible printed circuit FPC2 is connected to the second main surface F2.

FIG. 2 is an enlarged view showing cross-sections of the display panel PNL, the cover glass CG, etc. It also shows a cross section of the shade tape 16 of the backlight BL. The array substrate AR comprises a first insulating substrate 30 which is, for example, a glass substrate. The array substrate AR further comprises an undercoat layer 31, a first insulating layer 32, a second insulating layer 33, a third insulating layer 34 and a first alignment film 35, on a surface of the first insulating substrate 30 which faces the counter-substrate CT.

The undercoat layer 31 covers the first insulating substrate 30. The first insulating layer 32 covers the undercoat layer 31. For example, the first insulating layer 32 is intended to isolate gate electrodes and semiconductor layers formed of polysilicon or the like which are included in switching elements provided in respective pixels in the display area DA. The second insulating layer 33 is formed of, for example, organic resin material, and covers the second insulating layer 33, the switching elements, etc. For example, on the second insulating layer 33, the common electrode is provided over and common to a plurality of pixels in the display area DA. The third insulating layer 34 is formed of, for example, inorganic silicon nitride, and covers the second insulating layer 33 and the common electrode. On the third insulating layer 34, pixel electrodes are formed, and provided in respective pixels in the display area DA. The first alignment film 35 covers the third insulating layer 34, the above pixel electrodes, etc.

On the other hand, the counter-substrate CT comprises a second insulating substrate 40 which is, for example, a glass substrate. The counter-substrate CT further comprises a second light shielding layer 41 (black matrix), a color filter 42, an overcoat layer 43 and a second alignment film 44, on a surface of the second insulating substrate 40 which faces the array substrate AR.

The second light shielding layer 41 overlaps with the non-display area NDA as viewed in plan view. Furthermore, the second light shielding layer 41 is also partially located in the display area DA and opposite to scanning lines, signal lines, switching elements, etc. The color filter layer 42 is provided mainly in the display area DA and in an opening in the second light shielding layer 41. The color filter layer 42 is formed of color resists having colors associated with the pixels. For example, in the case where in the display area DA, pixels associated with red, green, blue and white are arranged, the color filter layer 42 contain color resists having those colors. In this case, color resists need not to be provided for the pixels associated with white.

The overcoat layer 43 covers the second light shielding layer 41 and the color filter layer 42. The second alignment film 44 covers, in the display area DA, the overcoat layer 43. In the example shown in FIG. 2, the second alignment film 44 also extends to the non-display area NDA.

The array substrate AR and the counter-substrate CT are attached to each other by a sealant 50 which is annularly formed in the non-display area NDA in such a way as to surround the display area DA. In space surrounded by the first alignment film 35, the second alignment film 44 and the sealant 50, a liquid crystal layer LC containing liquid crystal molecules is enclosed. In the example shown in FIG. 2, part of the second insulating layer 33 in which the above sealant 50 is to be formed is removed, and the sealant 50 is then filled in the part of the second insulating layer 33. As a result, water or the like can be prevented from entering the liquid crystal layer LC from the outside of the sealant 50.

Between the array substrate AR and the counter-substrate CT, main spacers 51 (first spacers), sub-spacers 52 (second spacers) and end spacers 53 are provided. The main spacers 51, the sub-spacers 52 and the end spacers 53 are formed on, for example, the counter-substrate CT.

The main spacers 51 serve to keep a cell gap between the array substrate AR and the counter-substrate CT at a predetermined distance. In the example shown in FIG. 2, color resists 54 formed in the same step as the color filter layer 42 are arranged in association with the main spacers 51.

Because of the color resists 54, the overcoat layer 43 partially protrudes, thus adjusting the heights of the main spacers 51. For example, the color resists 54 are colored blue. In the case where the second alignment film 44 is formed of material, the sub-spacers 52 serve to prevent the material from extending toward the sealant 50 before the second alignment film 44 cures. The end spacers 53 are located outside the sealing member, and enhance the strength of part of the display panel PNL which is located in the vicinity of the end portion of the counter-substrate CT.

An end portion E1 of the second polarizing plate PL2 is located, for example, in the vicinity of the sub-spacers 52. An end portion E2 of the second flexible printed circuit FPC2 is located, for example, in the vicinity of one of ends portion of the sealant 50, which is located closer to the display area DA than the other end portion of the sealant 50.

In the example shown in FIG. 2, the second light shielding layer 41 includes an end-portion slit 60 provided close to the sealant 50, and a boundary slit 61 provided close to the boundary between the non-display area NDA and the display area DA. The end-portion slit 60 is filled with the overcoat layer 43. The end-portion slit 60 serves to prevent water from entering the counter-substrate CT from the end portion thereof. The boundary slit 61 serves to prevent, when the second light shielding layer 41 becomes charged with electricity in the non-display area NDA, this charge from influencing the display area DA. In the boundary slit 61, a color resist 55 formed in the same step as the color filter layer 42 is provided. The color resist 55 is made by stacking color resists having different colors such as red and blue together, and prevents light from leaking from the boundary slit 61.

The shade tape 16 extends over the end portion E1 of the second polarizing plate PL2, the sealant 50, the end portion E2 of the second flexible printed circuit FPC2, etc., as seen in plan view.

The display panel PNL as shown in FIG. 2 has a structure to which for example, an in-plane switching (IPS) mode and a fringe field switching (FFS) mode included in the IPS mode can be applied. In the IPS mode, liquid crystal molecules are driven by an electric field (lateral electric field) substantially parallel to a main surface of the array substrate AR, which is formed between pixel electrodes and a common electrode, and in the FFS mode, either the pixel electrodes or the common electrode is formed planate. However, the display panel PNL may have a structure to which a mode using a so-called lateral electric field to drive liquid crystal molecules, as in, for example, a twisted nematic (TN) mode or a vertical aligned (VA) mode, can be applied.

In attachment of the cover glass CG, the second polarizing plate PL2 provided at the display panel PNL is coated with, for example, gelled ultraviolet curable resin of which the adhesive layer 21 is formed. At this stage, the backlight BL has not yet been provided. The above ultraviolet curable resin is irradiated with ultraviolet light from, for example, a cover-glass side where the cover glass CG is located (the upper side of FIG. 2), an array-substrate side where the array substrate AR is located (the lower side of FIG. 2) and an end-portion side where end portions of the cover glass CG and the display panel PNL are located (the left side of FIG. 2 or like). A process of heating the ultraviolet curable resin may be added. In the non-display area NDA as shown in FIG. 2, the first light shielding layer 20 provided on the first light shielding layer 20 extends over the end portion E1 of the second polarizing plate PL2 as seen in plan view. Therefore, in the vicinity of the end portion E1, the first light shielding layer 20 blocks ultraviolet light radiated from the cover-glass side where the cover glass CG is located (the upper side of FIG. 2).

In the second polarizing plate PL2, for example, a polarizer is provided and held by resin layers such as protective layers. At the end portion of the second polarizing plate PL2, for example, the polarizer is exposed from the protective layers to the outside thereof, resin which has not cured runs off the end portion E1 of the second polarizing plate PL2, and the polarizer can be swollen by the resin.

FIG. 3 is a cross-sectional view schematically showing the swollen end portion E1 of the second polarizing plate PL2. FIG. 3 shows that the end portion is more greatly swollen than in reality in order to explain what influence is exerted by swelling of the end portion. Between the cover glass CG and the display panel PNL, the end portion E1 of the second polarizing plate PL2 is swollen, and as a result, the display panel PNL is deformed such that the distance between the display panel PNL and the cover glass CG gradually increases to that at an end portion of the display panel PNL. This deformation causes provision of an abnormal region UA which is larger than an ordinary cell gap between the array substrate AR and the counter-substrate CT. If the abnormal area UA reaches the display area DA, a display color more greatly takes on a yellow tinge than usual, and as a result, the display quality is reduced. Such a phenomenon is referred to as a yellow border or the like. The yellow border more remarkably appears as the thickness of the display panel PNL decreases.

In the above embodiment, in order to prevent the display quality from being reduced because of the yellow border, an opening portion is provided in the second light shielding layer 41 to cause curing of the ultraviolet curable resin to be promoted by ultraviolet light radiated from the array-substrate side where the array substrate AR is located (the lower side of FIG. 2). The opening portion is provided by removing at least part of the second light shielding layer 41 in an open region XA as shown in FIG. 2.

Figure 4:
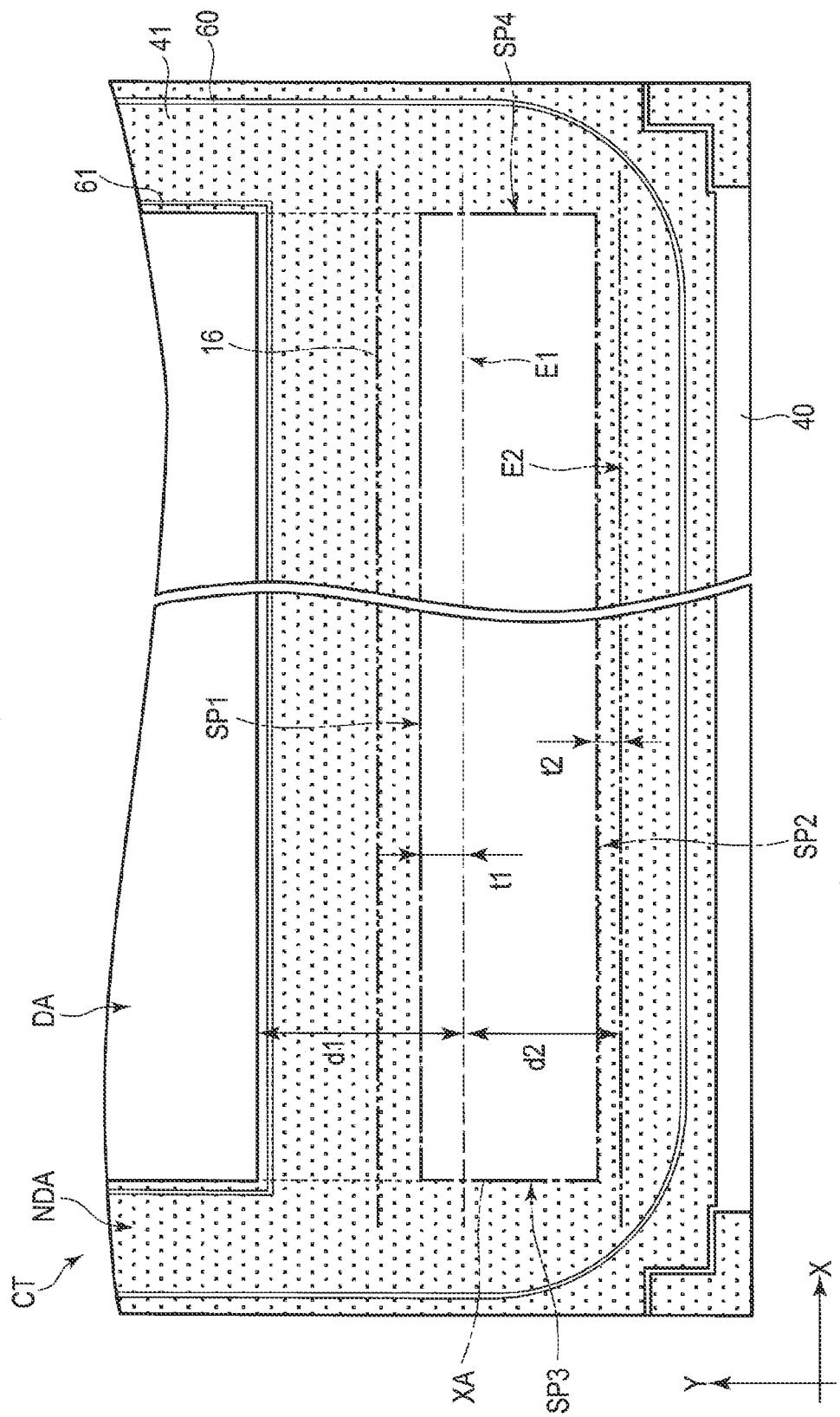
FIG. 4 is a plan view schematically showing an end portion of a counter-substrate and a neighboring portion close to the end portion, which are located on a terminal-area side.

The position of the open region XA will be explained with reference to FIGS. 2 and 4. FIG. 4 is a plan view schematically showing the end portion of the counter-substrate CT and a neighboring portion close to the end portion, on a terminal-area side where the terminal area LA is located. In FIG. 4, an area correspond to the second light shielding layer 41 is shaded with dots. The end-portion slit 60 as shown in FIG. 2 is provided along an edge portion of the second light shielding layer 41, and the boundary slit 61 is provided in such a way as to surround the display area DA. The open region XA is provided between the end-portion slit 60 and the boundary slit 61.

In the example shown in FIG. 4, the open region XA is surrounded by a first side portion SP1, a second side portion SP2, a third side portion SP3 and a fourth side portion SP4, the first and second side portions SP1 and SP2 extending in a first direction X, the third and fourth side portions SP3 and SP4 extending in a second direction Y. For example, the first direction X is parallel to a side of the display area DA which is closer to the terminal area LA than the other sides of the display area DA, and the second direction Y is perpendicular to the first direction X. For example, the first and second side portions SP1 and SP2 are long sides, and the third and fourth side portions SP3 and SP4 are short sides which are shorter than long sides.

The first side portion SP1 is located closer to the display area DA than the end portion E1 of the second polarizing plate PL2. The concrete position of the first side portion SP1 can be determined in consideration of the position of the end portion E1 of the second polarizing plate PL2 according to design and a bonding tolerance of the second polarizing plate PL2. For example, as shown in FIG. 4, where the position of the end portion E1 according to design is separated from the display area DA by distance d1, the first side portion SP1 can be located in a position which is separated from the display area DA by distance d1 minus a distance corresponding to tolerance t1.

The second side portion SP2 is located closer to the end-portion slit 60 than the end portion E1 of the second polarizing plate PL2. The concrete position of the second side portion SP2 can be determined in consideration of the position of the end portion E2 of the second flexible printed circuit FPC2 according to design and a bonding tolerance of the second flexible printed circuit FPC2. For example, as shown in FIG. 4, where the position of the end portion E2 according to design is separated from the end portion E1 of the second polarizing plate PL2 by distance d2, the second side portion SP2 can be located in a position which is separated from the end portion E1 by distance d2 minus a distance corresponding to tolerance t2. In this case, the open region XA is not located opposite to the second flexible printed circuit FPC2.

In the example shown in FIG. 4, the third side portion SP3 and the fourth side portion SP4 are located on extensions of edge portions of the display area DA which extend in the second direction Y. On a second-side-portion side where the second side portion SP2 is located, ultraviolet light radiated from a side of the display panel PNL is blocked by the second flexible printed circuit FPC2, etc., and thus does not easily reach the ultraviolet curable resin. By contrast, on a third-side-portion where the third side portion SP3 is located and a fourth-side-portion side where the fourth side portion SP4 is located, the ultraviolet curable resin is desirably cured by the ultraviolet light radiated from the side of the display panel PNL. It should be noted that if the display panel PNL is made to have a narrower frame, and as a result a problem arises in curing of an adhesive agent, the third side portion SP3 and the fourth side portion SP4 can also be located outward of the extensions of the edge portions of the display area DA which extend in the second direction Y.

Since the positions of first and second side portions SP1 and SP2 are determined in the above manner, the end portion E1 of the second polarizing plate PL2 is located opposite to the open region XA. Therefore, when irradiated with ultraviolet light from the side of the display panel PNL, part of the ultraviolet curable resin which is located close to the end portion E1 is exposed to the ultraviolet light through the open region XA, and is thus desirably cured. Thereby, it is prevented or restricted that part of the ultraviolet curable resin which has not been cured comes into contact with the end portion E1, and causes swelling of the second polarizing plate PL2. Therefore, occurrence of a yellow border is also restricted, thus preventing or restricting reduction of the display quality. Furthermore, in an overlapping area of the open region XA and the end portion E1, the distance between the display area DA and the first side portion SP1 is set as great as possible, thus sufficiently preventing light from leaking to the vicinity of the display area DA.

Also, the shade tape 16 of the backlight BL and the first light shielding layer 20 of the cover glass CG extend over the open region XA as seen in plan view. Therefore, in the position of the open region XA, the shade tape 16 and the first light shielding layer 20 doubly block light from the backlight BL, thus properly preventing leakage of light. The shade tape 16 further projects toward the display area DA than the first side portion SP1 of the open region XA.

Furthermore, on the second-side-portion side where the second side portion SP2 is located, the second flexible printed circuit FPC2 is covered by the second light shielding layer 41, as a result of which the second flexible printed circuit FPC2 and the vicinity thereof are prevented from being visibly recognized from the outside of the cover glass CG, thus improving the appearance of the display device 1.

It should be noted that in a region over which the sealant 50 is located as seen in plan view, there is a possibility of the sealant 50 blocking some of the ultraviolet light. Thus, as shown in FIG. 2, the second side portion SP2 may be provided in the position of an end portion of the sealant 50 or in a position which is closer to the display area DA than the position of the end portion of the sealant 50. In this case, the open region XA is not located opposite to the sealant 50.

First to twelfth embodiments will be explained as concrete examples of the opening portion provided in the open region XA.

Figure 5:
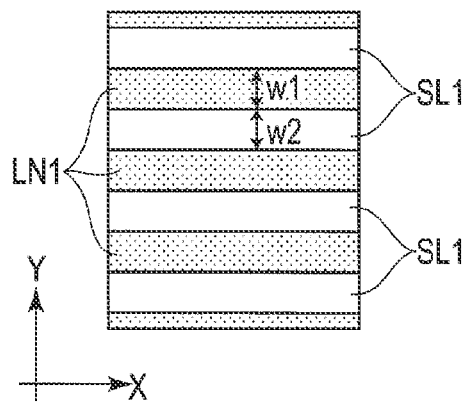
FIG. 5 is a view for explaining a concept which is common to first to seventh embodiments.

FIG. 5 is a view for explaining a concept which is common to the first to seventh embodiment, and also shows part of the open region XA. For example, the opening portion provided in the open region XA can be formed to include such slits SL1 as shown in FIG. 5. The slits SL1 extend in the first direction X, and are arranged in the second direction Y. Also, lines LN1, which are formed between the slits SL1 in the second light shielding layer 41, extend in the first direction X, and are arranged in the second direction Y. For example, each of the lines LN1 has width w1 in the second direction Y, which is constant throughout its total length. For example, each of the slits SL1 has width w2 in the second direction Y, which is constant throughout its total length.

First Embodiment

Figure 6:
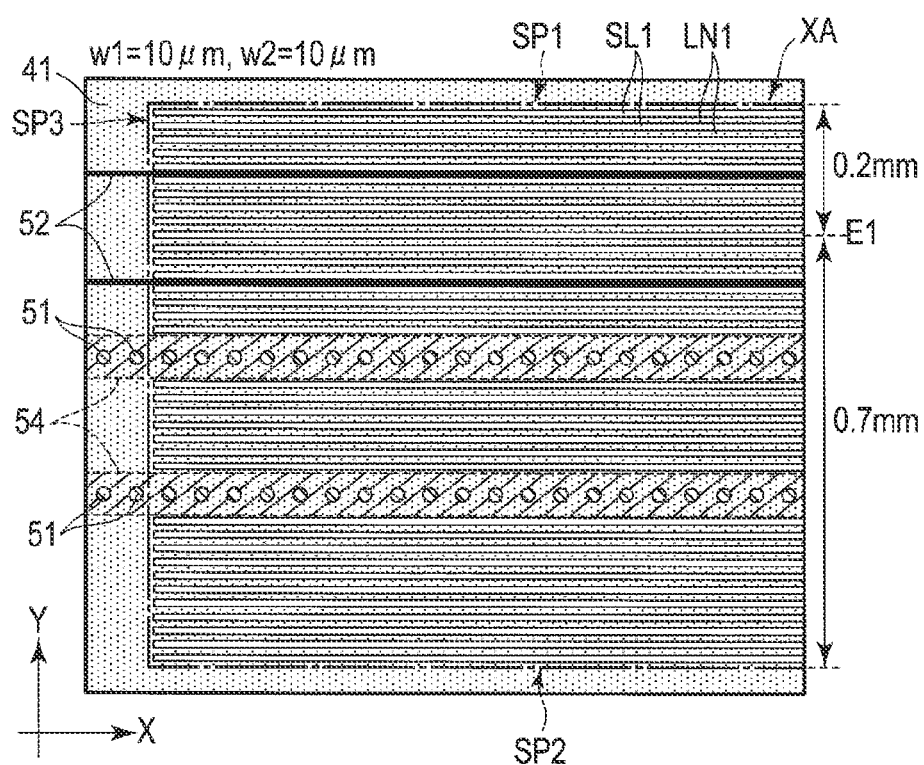
FIG. 6 is a view schematically showing part of an open region according to a first embodiment.

FIG. 6 is a view schematically showing part of the open region XA according to the first embodiment. In the open region XA, slits SL1 are successively provided from the vicinity of the first side portion SP1 to the vicinity of the second side portion SP2. Each of the slits SL1 is formed linearly from the vicinity of the third side portion SP3 to the vicinity of the fourth side portion SP4 (which is located on the right side of FIG. 6). In the first embodiment, widths w1 and w2 are both approximately 10 μm. Also, the distance between the first side portion SP1 and the end portion E1 of the second polarizing plate PL2 according to design is approximately 0.2 mm, and that between the second side portion SP2 and the end portion E1 according to design is approximately 0.7 mm.

FIG. 6 shows the positions and shapes of the main spacers 51, the sub-spacers 52 and the color resists 54, with they stacked on the second light shielding layer 41. The color resists 54 linearly extend in the first direction X. The main spacers 51 are arranged at regular intervals in areas in which the color resists 54 are located as seen in plan view. The sub-spacers 52 linearly extend in the first direction X.

In the first embodiment, as seen in plan view, in the above areas of the color resists 54 in which the main spacers 51 are located, corresponding portions of the second light shielding layer 41 are not removed. As a result, in the areas in which the main spacers 51 are located as seen in plan view, the thickness of each of the corresponding portions of the second light shielding layer 41 is constant, and the cell gap between the array substrate AR and the counter-substrate CT is appropriately maintained.

Second Embodiment

Figure 7:
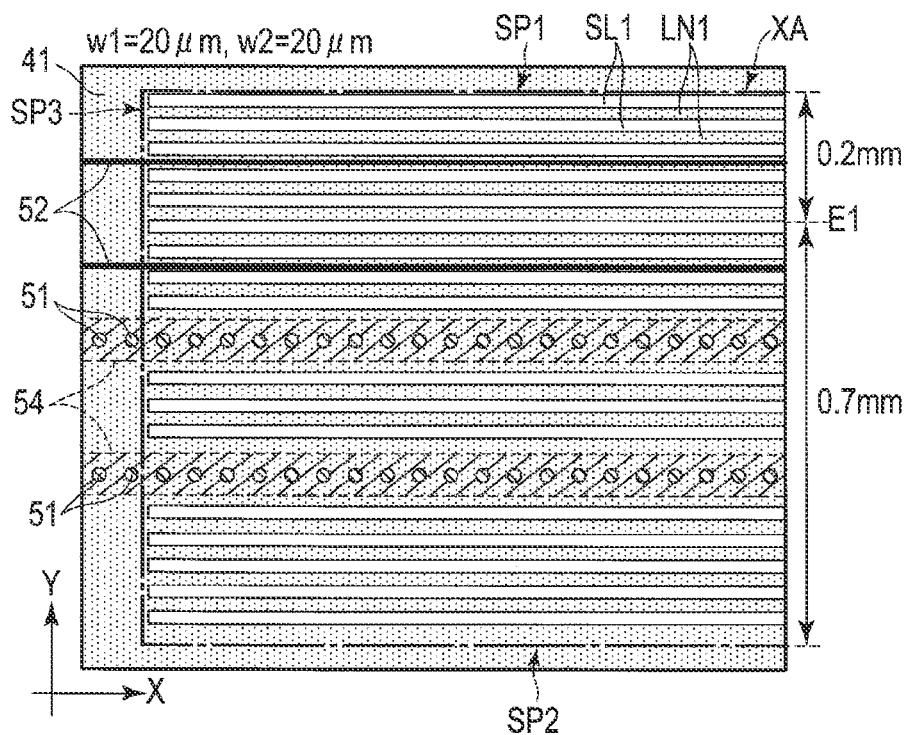
FIG. 7 is a view schematically showing part of an open region according to a second embodiment.

FIG. 7 is a view schematically showing part of the open region XA according to the second embodiment. In the second embodiment, widths w1 and w2 are both approximately 20 µm. In this regard, the second embodiment is different from the first embodiment.

Third Embodiment

Figure 8:
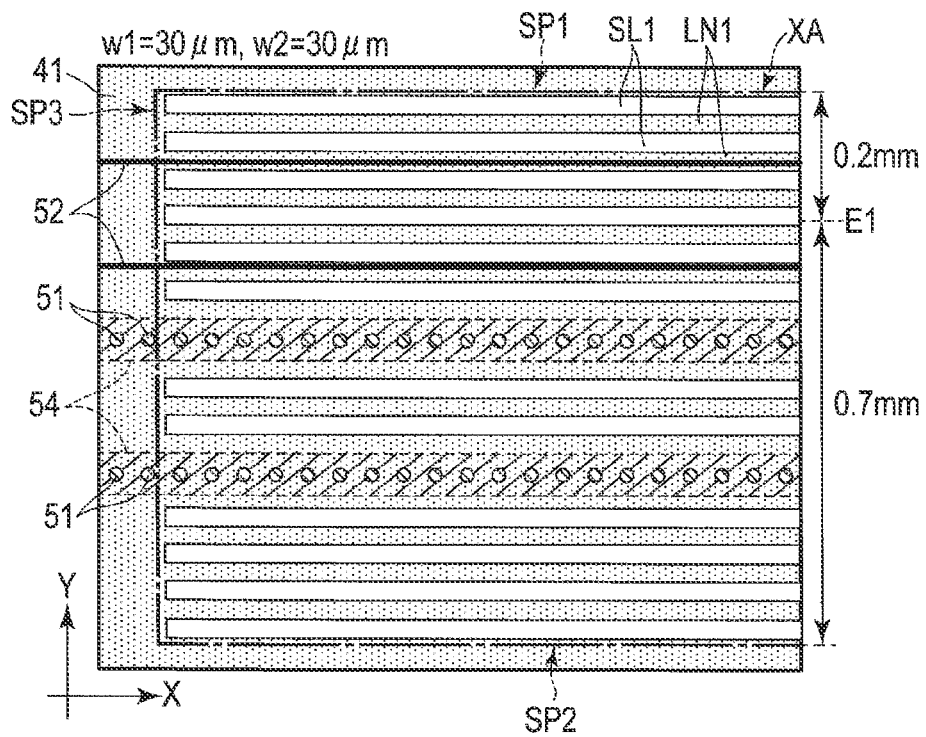
FIG. 8 is a view schematically showing part of an open region according to a third embodiment.

FIG. 8 is a view schematically showing part of the open region XA according to the third embodiment. In the third embodiment, widths w1 and w2 are both approximately 30 µm. In this regard, the third embodiment is different from the first embodiment.

Fourth Embodiment

Figure 9:
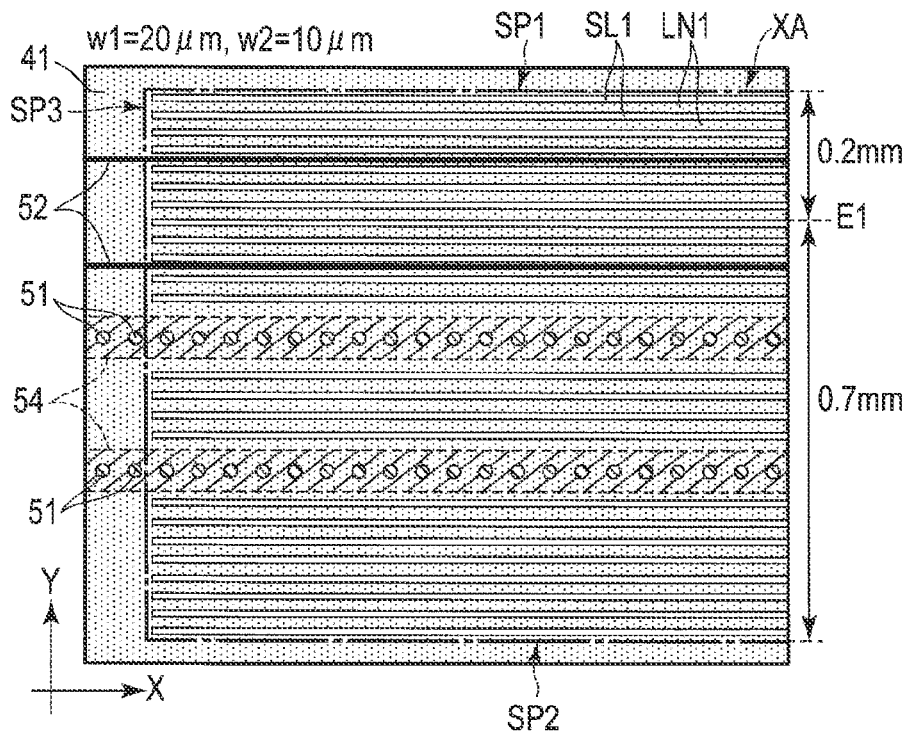
FIG. 9 is a view schematically showing part of an open region according to a fourth embodiment.

FIG. 9 is a view schematically showing part of the open region XA according to the fourth embodiment. In the fourth embodiment, width w1 is greater than width w2. In this regard, the fourth embodiment is different from the first embodiment. To be more specific, width w1 is approximately 20 µm, and width w2 is approximately 10 µm.

Fifth Embodiment

Figure 10:
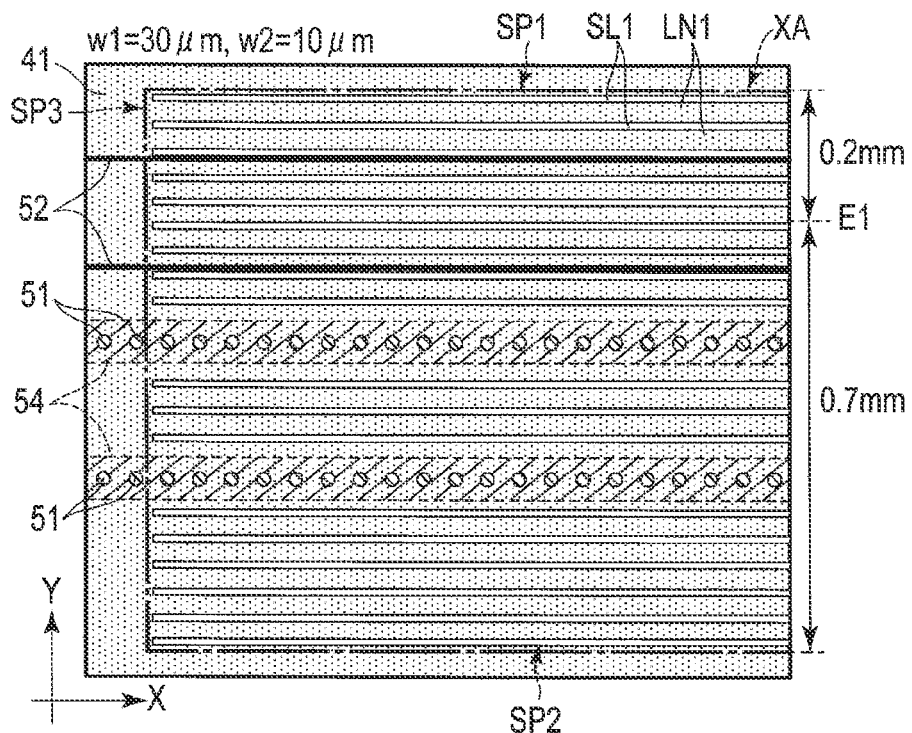
FIG. 10 is a view schematically showing part of an open region according to a fifth embodiment.

FIG. 10 is a view schematically showing part of the open region XA according to the fifth embodiment. In the fifth embodiment, width w1 is greater than width w2 as in the fourth embodiment. In this regard, the fifth embodiment is different from the first embodiment. To be more specific, width w1 is approximately 30 µm, and width w2 is approximately 10 µm.

Sixth Embodiment

Figure 11:
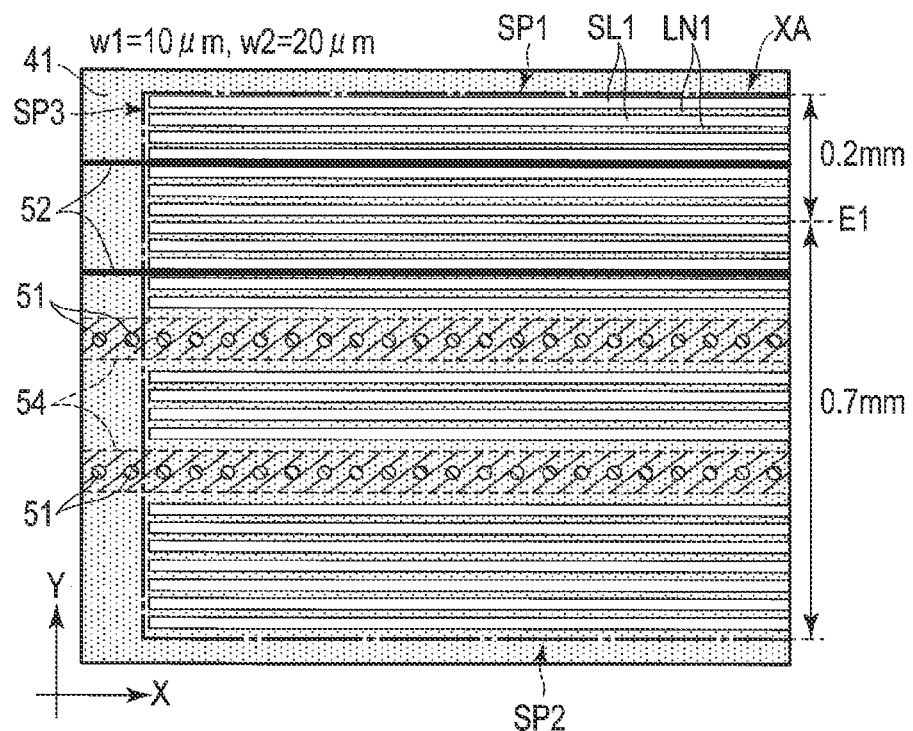
FIG. 11 is a view schematically showing part of an open region according to a sixth embodiment.

FIG. 11 is a view schematically showing part of the open region XA according to the sixth embodiment. In the sixth embodiment, width w1 is smaller than width w2. In this regard, the sixth embodiment is different from the first embodiment. To be more specific, width w1 is approximately 10 µm, and width w2 is approximately 20 µm.

Seventh Embodiment

Figure 12:
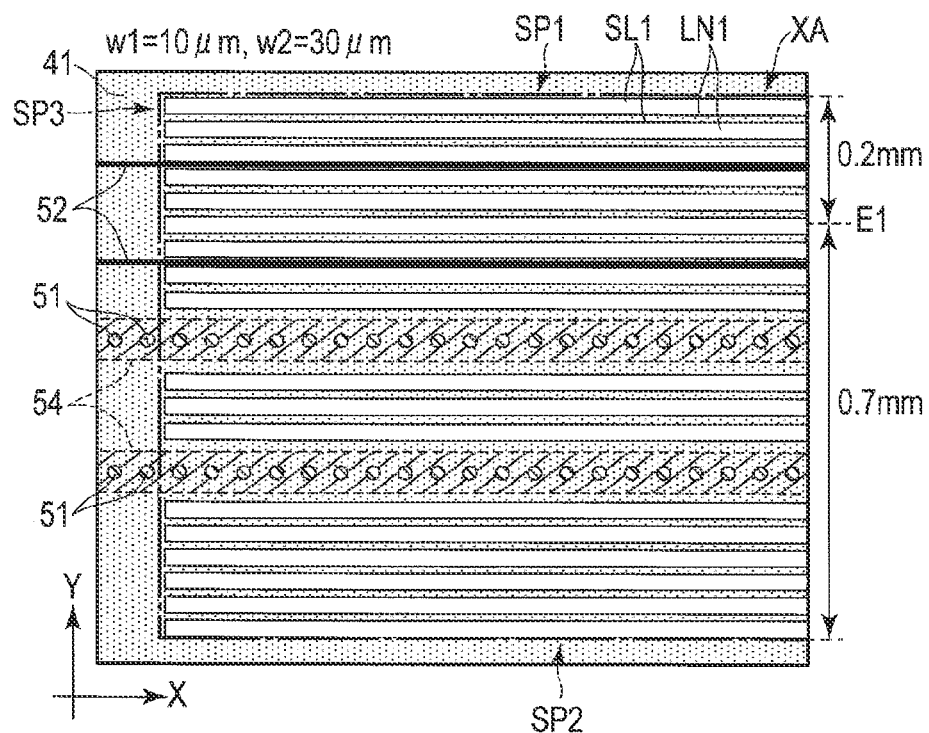
FIG. 12 is a view schematically showing part of an open region according to a seventh embodiment.

FIG. 12 is a view schematically showing part of the open region XA according to the seventh embodiment. In the seventh embodiment, width w1 is smaller than width w2 as in the sixth embodiment. In this regard, the seventh embodiment is different from the first embodiment. To be more specific, width w1 is approximately 10 µm, and width w2 is approximately 30 µm.

Furthermore, widths w1 and w2 can be appropriately set to values other than the values described above with respect to the first to seventh embodiments. In addition, in the open region XA, slits may be provided which extend in the second direction Y, and are arranged in the first direction X. In this case also, the widths of the slits and lines can be set to appropriate values.

Figure 13:
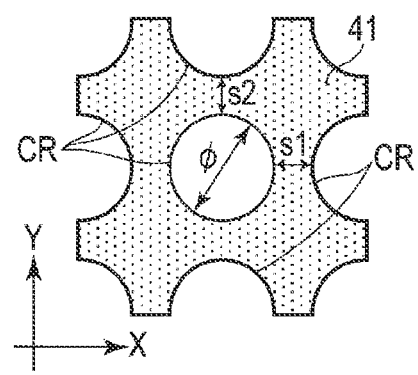
FIG. 13 is a view for explaining a concept which is common to eighth and ninth embodiments.

FIG. 13 is a view for explaining a concept which is common to eighth and ninth embodiments, and also shows part of the open region XA. The opening portion provided in the open region XA can be formed to include small holes CR each of which for example, is precisely circular and has diameter φ as shown in FIG. 13. The holes CR are arranged in the first direction X and the second direction Y. The distances between holes CR arranged in the first direction X are s1, and those between holes CR arranged in the second direction Y are s2.

Eighth Embodiment

Figure 14:
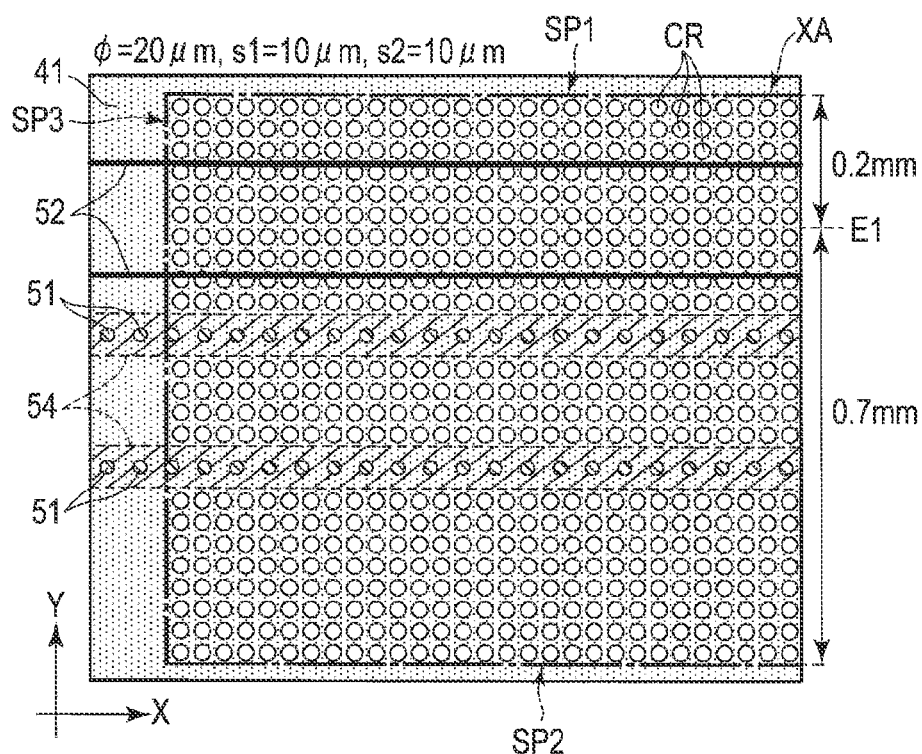
FIG. 14 is a view schematically showing part of an open region according to the eighth embodiment.

FIG. 14 is a view schematically showing part of the open region XA according to the eighth embodiment. In substantially the entire area of the open region XA, the holes CR are formed. In the eighth embodiment, diameter φ is approximately 20 µm, and distances s1 and s2 are both approximately 10 µm. Also, the distance between the first side portion SP1 and the end portion E1 of the second polarizing plate PL2 according to design is approximately 0.2 mm, and that between the second side portion SP2 and the end portion E1 according to design is approximately 0.7 mm. In the eighth embodiment, as in the first embodiment, in areas of the color resists 54 in which the main spacers 51 are located as seen in plan view, corresponding portions of the second light shielding layer 41 are not removed.

Ninth Embodiment

Figure 15:
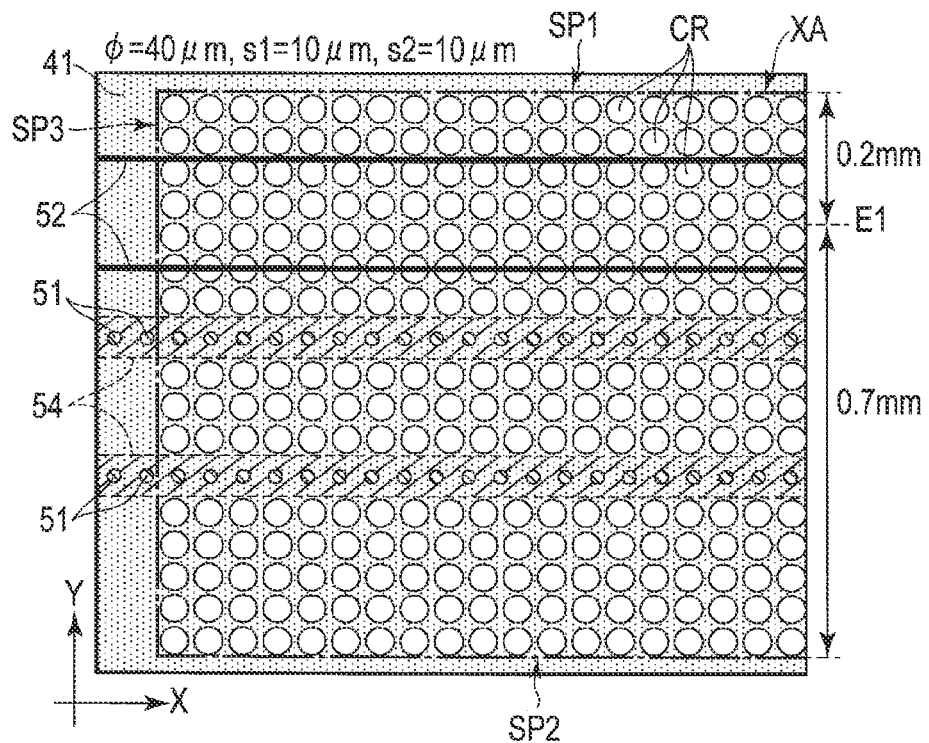
FIG. 15 is a view schematically showing part of an open region according to the ninth embodiment.

FIG. 15 is a view schematically showing part of the open region XA according to the ninth embodiment. In the ninth embodiment, diameter φ is approximately 40 µm, and distances s1 and s2 are both approximately 10 µm. In this regard, the ninth embodiment is different from the eighth embodiment.

Diameter φ and distances s1 and s2 can be appropriately set to values other than the values indicated above with respect to the eighth and ninth embodiments. Furthermore, the holes CR may be randomly arranged in the open region XA. Also, the holes CR may be formed such that the closer their positions to the end portion E1, the higher their density. In addition, the shape of each hole CR is not limited to a precise circle, that is, each hole CR may be formed to have another shape such as an oval.

Tenth Embodiment

Figure 16:
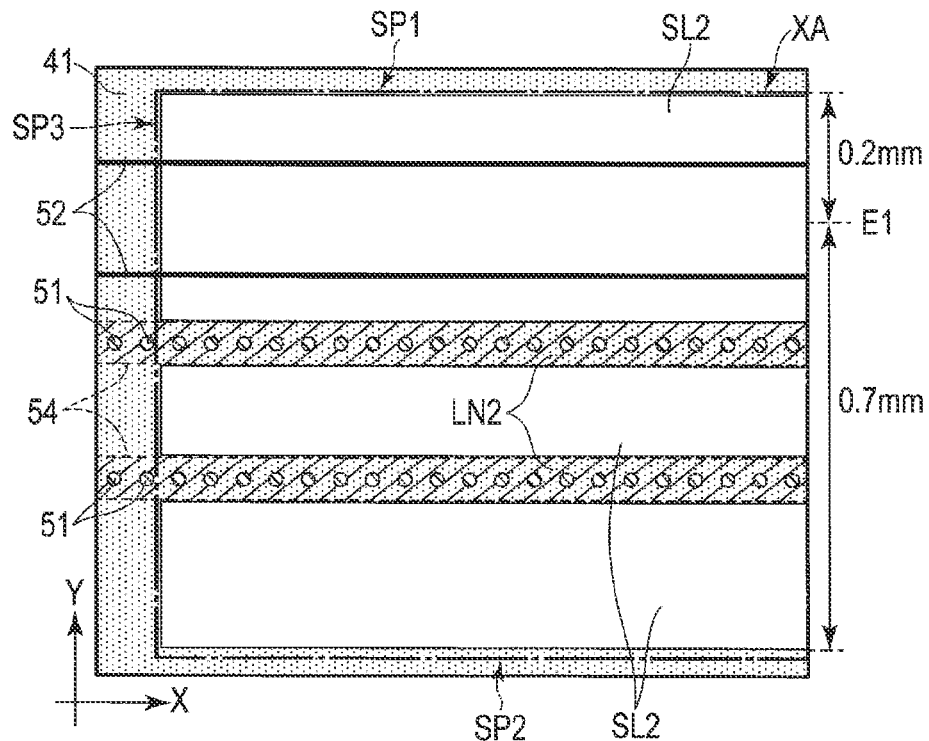
FIG. 16 is a view schematically showing part of an open region according to a tenth embodiment.

FIG. 16 is a view schematically showing part of the open region XA according to the tenth embodiment.

In the tenth embodiment, except for areas of the open region XA in which the color resists 54 are located as seen in plan view, the second light shielding layer 41 is removed. In this regard, the tenth embodiment is different from the above embodiments. To be more specific, in the open region XA, two line LN2 are formed which correspond to remaining portions (unremoved portions) of the second light shielding layer 41, where two color resists 54 are located as seen in plan view. In areas isolated from each other by the lines LN2, three slits SL2 are provided by removing portions of the second light-shielding layer 41 which are located in the isolated areas. In the example shown in FIG. 16, the slits SL2 and the lines LN2 extend in the first direction X, and each of each slit SL2 and each line LN2 has substantially a constant width in the second direction Y throughout its total length.

In a structure in which part of the second light shielding layer 41 which is located in large part of the open region XA is removed as in the tenth embodiment, the end portion E1 of the second polarizing plate PL2 and the neighboring portion close to the end portion E1 can be irradiated with a larger amount of ultraviolet light, and the adhesive layer 21 can be more properly cured.

Figure 17:
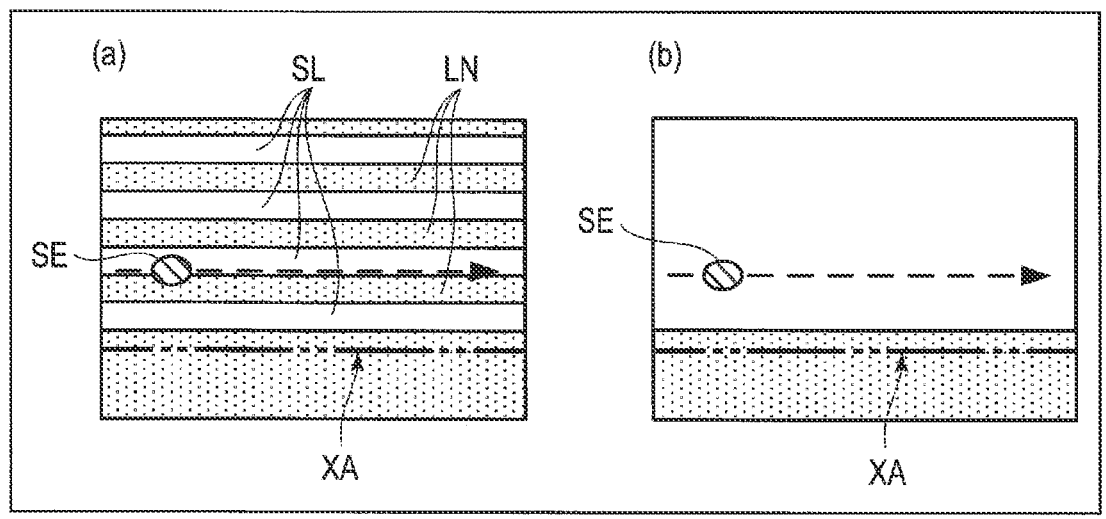
FIG. 17 is a view for explaining an advantage of the tenth embodiment.

Furthermore, in processing to attach the array substrate AR and the counter-substrate CT to each other, the counter-substrate CT can be coated with the sealant 50 with a higher accuracy. This will be specifically explained with reference to FIG. 17. When the sealant 50 is applied, a dispenser is used. The dispenser includes a nozzle which applies the sealant 50 and a sensor SE which detects an irregularity, etc. of a surface of the counter-substrate CT which is to be coated with the sealant 50, when the nozzle is located close to the surface. When part of the nozzle which applies the sealant 50 is close to the open region XA, detection part of the sensor SE can be located in the open region XA as seen in plan view. In the case where slits SL and lines LN each having a small width are alternately formed in the open region XA, in the vicinity of an edge portion of a slit SL or a line LN, there is a case where the sensor SE is moved parallel to the edge portion as shown in FIG. 17(a). In this case, there is a possibility that a detection signal from the sensor SE will interferes with a step formed by the slit SL in the second light shielding layer 41, and becomes unstable, and an abnormality will occur in application of the sealant 50. By contrast, in the large part of the open region XA, if corresponding part of the second light shielding layer 41 is removed, no step is formed in the vicinity of a path along which the sensor SE is moved, as shown in FIG. 17(b). Therefore, the detection signal from the sensor SE is stable, and the sealant 50 can thus be applied with a high accuracy.

Eleventh Embodiment

Figure 18:
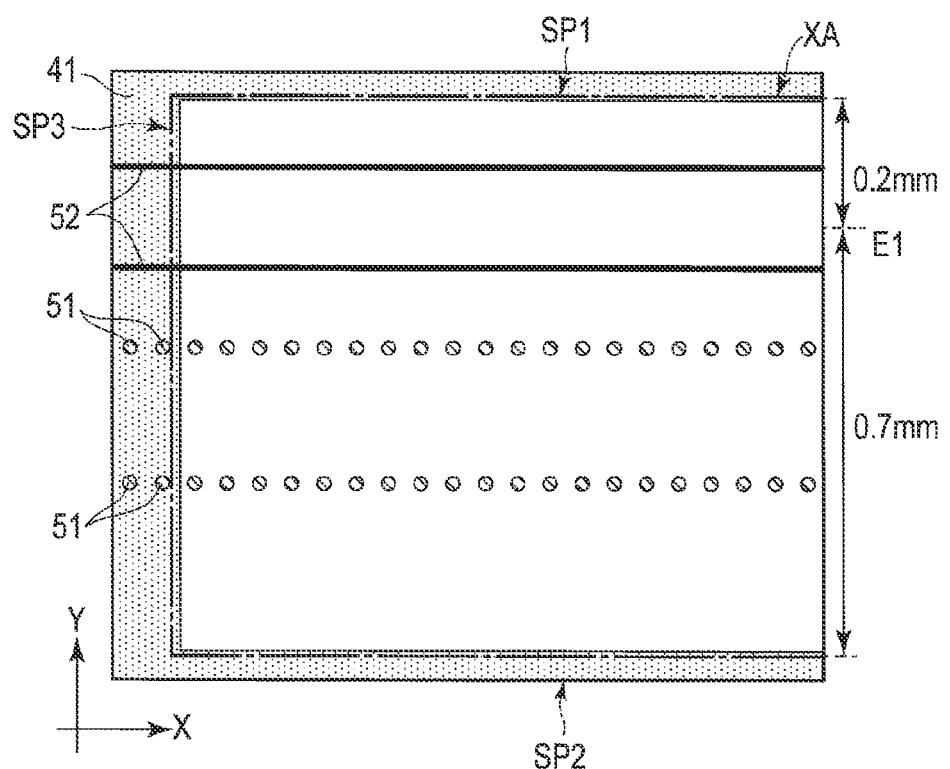
FIG. 18 is a view schematically showing part of an open region according to an eleventh embodiment.

FIG. 18 is a view schematically showing part of the open region XA according to the eleventh embodiment. In the eleventh embodiment, in the entire open region XA, the second light shielding layer 41 is removed. In this regard, the eleventh embodiment is different from the above embodiments. This structure can increase the amount of ultraviolet light to be radiated onto the ultraviolet curable resin through the open region XA to the maximum. Furthermore, it is possible to improve the accuracy with which the sealant 50 is applied, as in the tenth embodiment.

In the example shown in FIG. 18, color resists 54 are not provided in areas in which the main spacers 51 are located as seen in plan view. As a result, the sensor SE is not influenced by steps which would be formed by provision of the color resists 54. It is therefore possible to further improve the accuracy with which the sealant 50 is applied. However, color resists 54 may be provided in the areas in which the main spacers 51 are located as seen in plan view, as in the other embodiments.

Furthermore it may be set that the main spacers 51 are not provided in the open region XA. This can prevent the main spacers 51 from interfering with the sensor SE, and further improve the accuracy of applying the sealant 50. Also, it may be set that sub-spacers 52 are not provided in the open region XA.

Twelfth Embodiment

Figure 19:
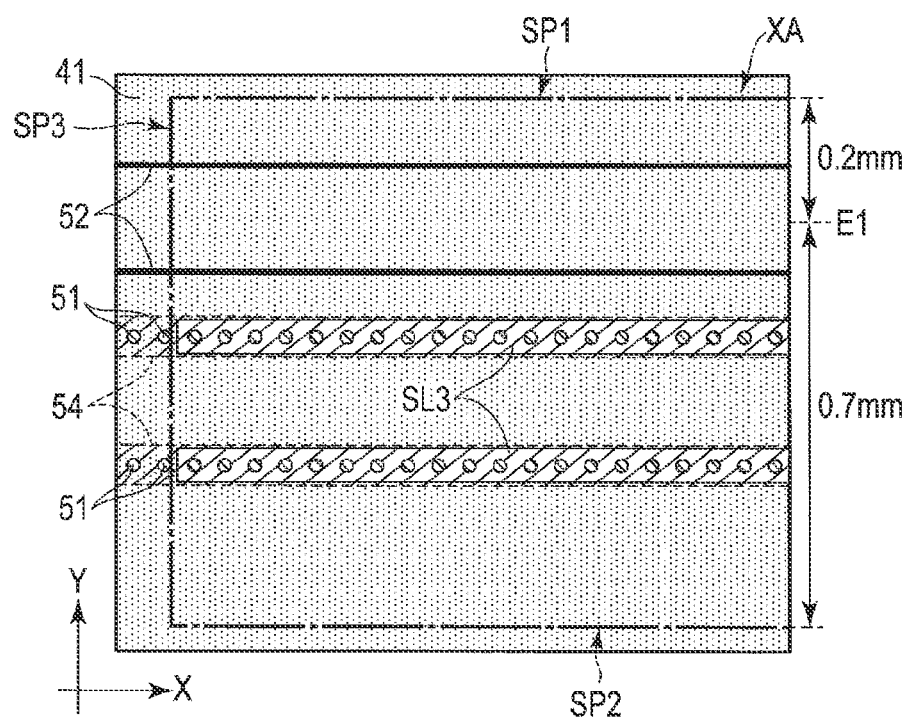
FIG. 19 is a view schematically showing part of an open region according to a twelfth embodiment.

FIG. 19 is a view schematically showing part of the open region XA according to the twelfth embodiment. In the twelfth embodiment, in the open region XA, only portions of the second light shielding layer 41 which correspond in position to the color resists 54 are removed. In this regard, the twelfth embodiment is different from the above embodiment. To be more specific, two color resists 54 and two slits SL3 corresponding thereto are provided in the second light shielding layer 41. The slits SL3 extend in the first direction X. In the example shown in FIG. 19, each of the slits SL3 has a width in the second direction Y, which is smaller than the width of each of the color resists 54 in the second direction Y. For example, where the width of each color resist 54 is approximately 60 μm, the width of each slit SL3 can be set to approximately 50 μm.

Thirteenth Embodiment

Figure 20:
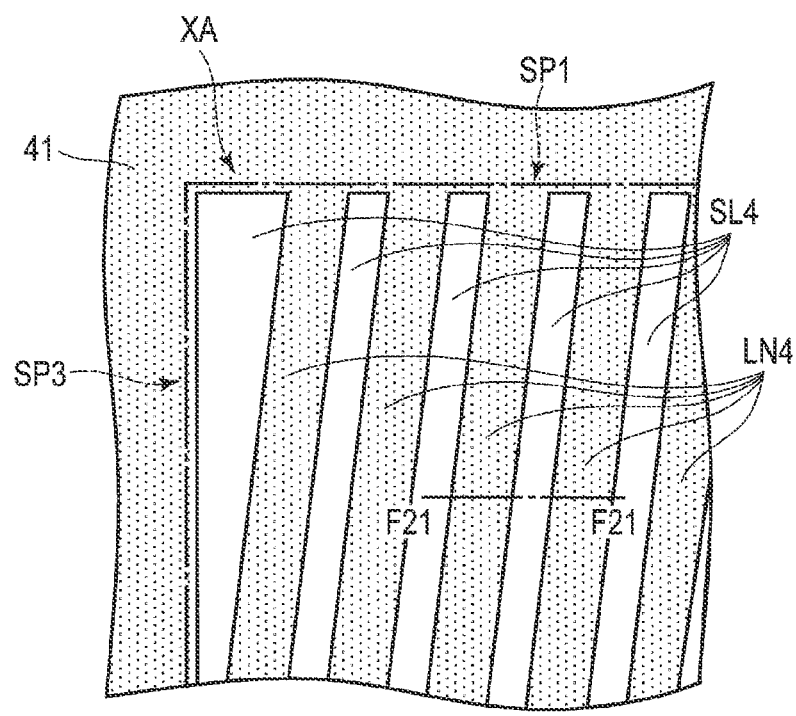
FIG. 20 is a view schematically showing part of an open region according to a thirteenth embodiment.

FIG. 20 is a view schematically showing part of the open region XA according to the thirteenth embodiment. In the thirteenth embodiment, in the open region XA, the second light shielding layer 41 is patterned to have a shape corresponding to various lines provided in the array substrate AR. In this regard, the thirteenth embodiment is different from the above embodiments. To be more specific, in the open region XA, plural slits SL4 and lines LN4 are formed and spaced from each other.

Figure 21:
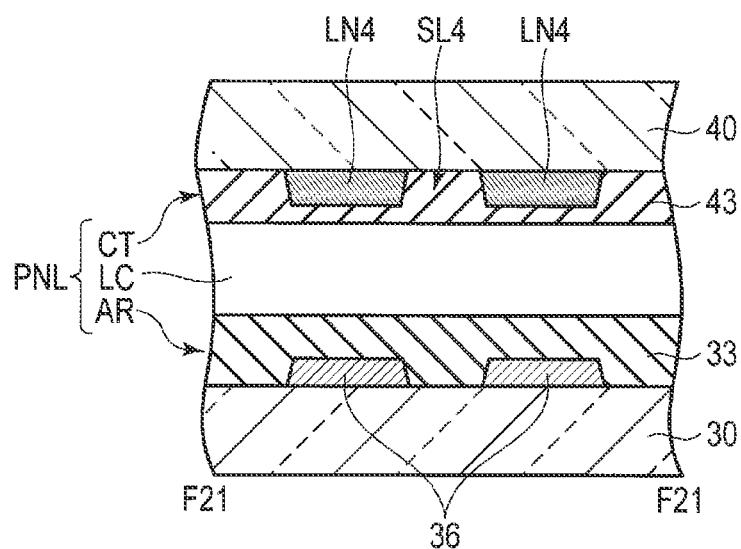
FIG. 21 is a view schematically showing a cross section of a display panel which is taken along line F21-F21 in FIG. 20.

FIG. 21 is a view schematically showing a cross section of the display panel PNL which is taken along line F21-F21 in FIG. 20. In FIG. 21, some of the elements included in the array substrate AR and the counter-substrate CT are omitted. In the array substrate AR, plural lines 36 are formed. The lines 36 correspond to, for example, scanning and signal lines referred to above or lines extending from a circuit which drives the scanning and signal lines, and are formed of metallic material. In addition, lines LN4 are formed opposite to the lines 36 with respect to the liquid crystal layer LC, etc. The lines 36 formed of metallic material can reflect light which is incident from a side where the second insulating substrate 40 is located, on the display panel PNL. However, the formed lines LN4 can block the reflected light, and improve the appearance of the display panel PNL. It should be noted that if at the open region XA, light leaks, it suffices that the second light shielding layer 41 is patterned such that portions of the second light shielding layer 41, which are located in areas where the lines 36 are not formed as seen in plan view, remain. Furthermore, it may be set that a given area of the open region XA is made to have such a structure as shown in FIG. 21, and the other area of the open region XA is made such that portions of the second light shielding layer 41, which are located in areas where the lines 36 are not formed as seen in plan view, remain.

Fourteenth Embodiment

Figure 22:
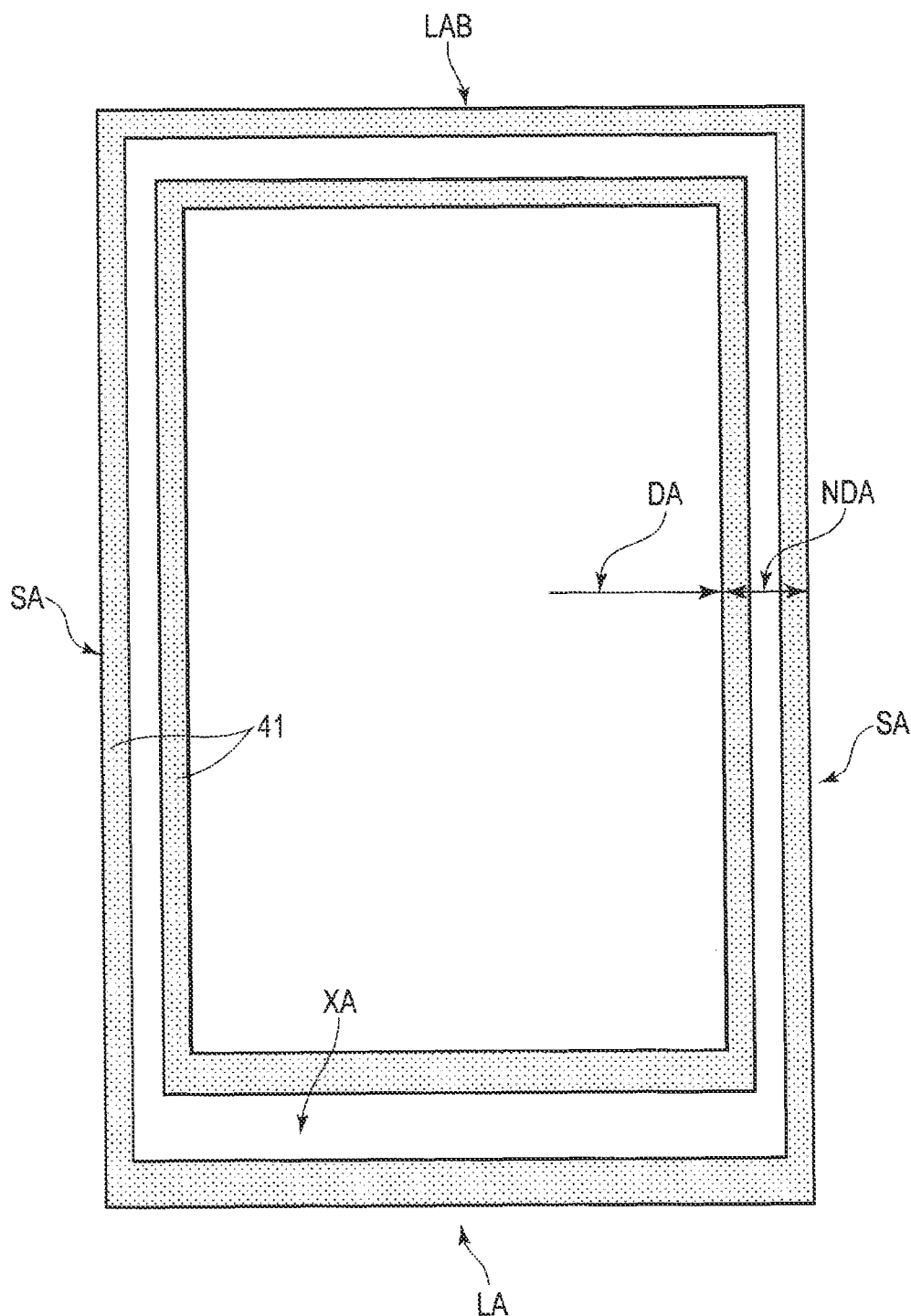
FIG. 22 is a view schematically showing an open region according to a fourteenth embodiment.

FIG. 22 is a view schematically showing the open region XA according to the fourteenth embodiment. In the above embodiments, the open region XA is provided on one of the four sides of the second light shielding layer 41 which is the closest to the terminal area LA. By contrast, the fourteenth embodiment is featured in that the open region XA is provided along the four sides of the second light shielding layer 41. It should be noted that even in areas other than one of the sides which is the closest to the terminal area, there is a case where an adhesive agent comes into contact with the end portion of the polarizing plate or cannot be sufficiently cured, because of the material of the adhesive agent, the size of the polarizing plate, the structure of a display panel or the like. In such a case, the fourteenth embodiment is advantageous.

Referring to FIG. 22, the open region XA is annular (rectangular), and surrounds the display area DA. The open region XA is located in areas in which four sides of each of the second polarizing plate PL2 and the adhesive layer 21 are located as seen in plan view. In the open region XA, the second light shielding layer 41 is at least partially removed as in the above embodiments.

In the fourteenth embodiment, the width of part of the open region XA which is adjacent to the terminal area LA is greater than that of part of the open region XA which is adjacent to an opposite terminal area LAB located opposite to the terminal area LA. Furthermore, the width of each of parts of the open region XA which are adjacent to long side areas SA which connect the terminal area LA and the opposite terminal area LAB is smaller than that of the part of the open region XA which is adjacent to the opposite terminal area LAB. By virtue of this structural feature, it is possible to narrow parts of the non-display area NDA adjacent to the long side areas SA, which are highly required to be narrower.

It should be noted that the open region XA does not always need to have four sides; that is, it may be formed to have two sides only or three sides only. Furthermore, the open region XA and the end-portion slit 60 do not always need to be separated from each other; that is, they can be provided as a single element. Also, the open region XA and the boundary slit 61 do not always need to be separated from each other; that is, they can be provided as a single element. The same is true of the other embodiments. Furthermore, in the open region XA, the overcoat layer 43 is provided; however, instead of provide the overcoat layer 43, it is possible to fill in the open region XA, material which transmits light having such a wavelength as to cure an adhesive agent, such as ultraviolet light, but not easily transmit visible light. Thereby, visible light can be prevented from leaking from the display area.

The structures of the embodiments explained above can be combined arbitrarily. Also, the structure of the open region XA are not limited to the structures explained with respect to the above embodiments; that is, the open region XA can be made to have various structures.

At the end portion E1 of the second polarizing plate PL2 and the neighboring portion close to the end portion E1, the amount of ultraviolet light which travels from the array substrate AR to reach an ultraviolet curable resin of which the adhesive layer 21 is formed is determined in accordance with the aperture radio of the open region XA. For example, the aperture ratio corresponds to a value obtained by dividing, by the area of the entire open region XA, the sum of the open space of slits, small holes, etc., provided in the entire open region XA or part of the open region XA and the area of part of the open region XA, which overlaps with metallic material such as lines.

The inventors inspected what relationship is established between the above aperture ratio and the degree of curing of the ultraviolet curable resin. As a result, they found that in order to prevent swelling of the second polarizing plate PL2, ultraviolet curable resin to be applied, such as epoxy resin or acrylic resin, needs to have an aperture ratio of at least approximately 18%, and preferably 20% or more. Therefore, it is preferable that opening portions such as slits and small holes be formed to have an aperture ratio of 18% or more or 20% or more.

It should be noted that in general, in a non-display area to which flexible printed circuits are connected, the total area of lines provided in the array substrate AR increases from a center portion of the non-display area in a direction along one side of a display area adjacent to the non-display area toward both end portions of the non-display area. Therefore, in the case where the distribution of opening portions in the open region XA is substantially uniform throughout the open region XA, the aperture ratio of the open region XA gradually decreases to that of the end portion of the open region XA. In consideration of this point, the opening portions may be formed such that the area of opening portions gradually increases to those of both end portions of the open region XA, as a result of which the aperture ratio of the open region XA is made uniform throughout the open region XA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the case where a light shielding layer is provided in the array substrate AR, instead of using the second light shielding layer 41, it suffices that the open region XA is formed in the provided light shielding layer. Although the array substrate AR and the counter-substrate CT are rectangular, they may be each formed to have another shape. In this case, the second polarizing plate PL2 can be considered to be shaped in accordance with the shape of the counter-substrate CT. If so, the open region XA can be provided to have a shape which accords with end portions of the second polarizing plate PL2. Furthermore, although the open region XA is made by removing part of the second light shielding layer 41, if the frame is made narrower, and the distance between the end portion of each of the polarizing plates and the end portion of the counter-substrate CT is set smaller, the second light shielding layer 41 provided between the open region XA and the counter-substrate CT may be omitted. A structure obtained thereby will also be referred to as an opening in the embodiments.

Figure 23:
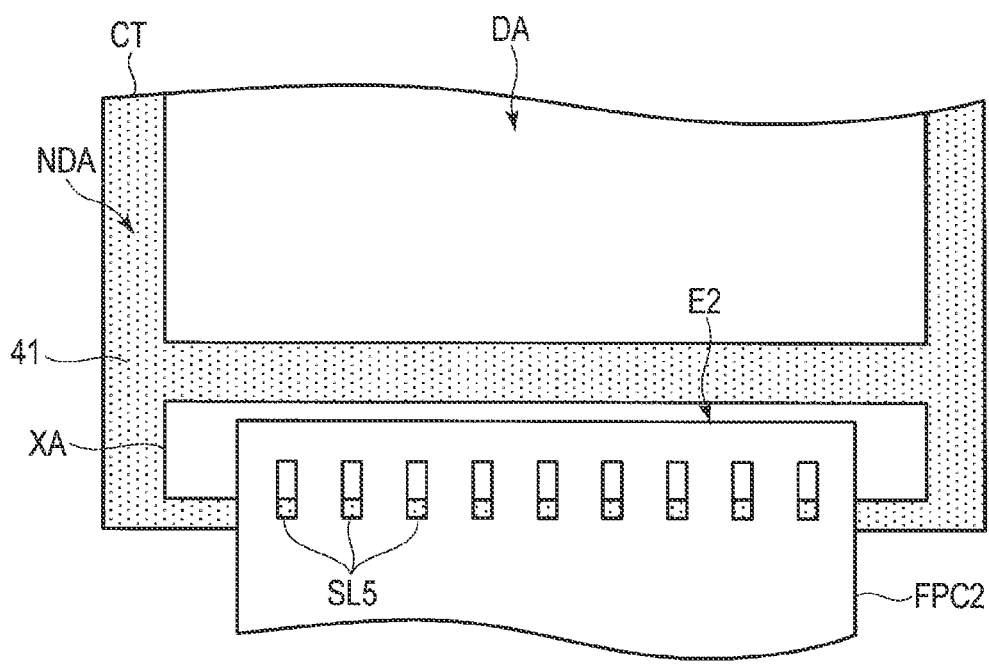
FIG. 23 is a view for explaining a modification.

The end portion E1 of the second polarizing plate PL2, the end portion E2 of the second flexible printed circuit FPC2, the position of the sealant 50, the position of the open region XA, etc., can be variously modified. In view of this point, a modification will be described with reference to FIG. 23. This figure schematically shows part of the counter-substrate CT and the second flexible printed circuit FPC2. The second flexible printed circuit FPC2 overlaps with the second light shielding layer 41, and the second flexible printed circuit FPC2 overlaps with the open region XA at the end portion E2 of the second flexible printed circuit FPC2. Furthermore, the second flexible printed circuit FPC2 includes plural slits SL5 in an area overlapping with the open region XA. For example, the adhesive layer 21 and the second polarizing plate PL2 extend from a display area DA side to locations where the slits SL5 of the second flexible printed circuit FPC2 are provided. In such a structure, ultraviolet light is radiated onto the ultraviolet curable resin of which the adhesive layer 21 is formed, through the slits SL5. Thus, the ultraviolet curable resin can be properly cured.

Furthermore, in the above embodiments, the cover glass CG is attached to the second polarizing plate PL2 by an adhesive agent. However, a touch panel may be provided between the cover glass CG and the second polarizing plate PL2. In this case, the embodiments can be applied to fixation of the second polarizing plate PL2 and the touch panel to each other; however, they can also be applied to the case where the touch panel and the cover glass are attached to each other by an adhesive agent. Also, there is a case where a single element into which the cover glass CG and the touch panel are combined is referred to as a cover member. Furthermore, although in the embodiments, the first polarizing plate PL1 and the second polarizing plate PL2 are attached to the display panel PNL, those polarizing plates attached to each other can also be referred to as a display panel. It should be noted that one of the objects of the embodiments is to prevent swelling which would be caused by contact of an adhesive agent with the end portion of the polarizing plate, and in addition, another one of the objects is to reduce the area onto which light for curing the adhesive agent is not sufficiently radiated, to thereby sufficiently cure the adhesive agent. In addition, in the case where an adhesive agent which has not yet been cured is spread by its viscosity and an external pressure, it is also possible to control the scope of spreading of the adhesive agent by radiating light onto the adhesive agent through the open region XA in advance before it is spread. That is, in the case where the end portion of the adhesive agent is located inward of the end portion E1 of the second polarizing plate PL2, the advantage of the embodiments can also be obtained. Also, the embodiments can be applied not only to the case where the display panel is attached to the polarizing plate, but the case where the display panel is attached to another member.

What is claimed is:

1. A display device comprising:
an array substrate including pixel electrodes in a display area; and
a counter substrate including a color resist, a light shielding layer, and an overcoat layer;
wherein
the light shielding layer includes a first slit and a second slit,
the first slit surrounds the display area,
the second slit surrounds the first slit,
the first slit is filled with the color resist,
the second slit is filled with the overcoat layer,
a width of the first slit is larger than a width of the second slit, and
the color resist in the first slit is covered by the overcoat layer.

2. The display device of claim 1, wherein the color resist in the first slit has blue color.

3. The display device of claim 1, wherein the color resist in the first slit has red color.

4. The display device of claim 1, wherein the color resist in the first slit includes stacked color resists having different colors.

5. The display device of claim 4, wherein the stacked color resists include a blue color resist and a red color resist.

6. The display device of claim 1, wherein
the first slit surrounds all of a circumference of the display area,
the second slit surrounds all of a circumference of the first slit,
each of the first slit and the second slit is located outside of the display area, and
the first slit is located between the display area and the second slit.

7. The display device of claim 6, wherein
the counter substrate includes an alignment film on the overcoat layer,
the first slit overlaps the alignment film, and
the second slit does not overlap the alignment film.

8. The display device of claim 6, further comprising a polarizing plate on the counter substrate, wherein
the first slit overlaps the polarizing plate, and
the second slit does not overlap the polarizing plate.

9. A substrate comprising:
a color resist;
a light shielding layer; and
an overcoat layer;
wherein
the light shielding layer includes a first slit and a second slit,
the first slit surrounds a display area,
the second slit surrounds the first slit,
the first slit is filled with the color resist,
the second slit is filled with the overcoat layer,
the first slit surrounds all of a circumference of the display area,
the second slit surrounds all of a circumference of the first slit,
each of the first slit and the second slit is located outside of the display area,
the first slit is located between the display area and the second slit,
a width of the first slit is larger than a width of the second slit, and
the color resist in the first slit is covered by the overcoat layer.

10. The substrate of claim 9, wherein the color resist in the first slit has blue color.

11. The substrate of claim 9, wherein the color resist in the first slit has red color.

12. The substrate of claim 9, wherein the color resist in the first slit includes stacked color resists having different color.

13. The substrate of claim 12, wherein the stacked color resists include a blue color resist and a red color resist.

14. The substrate of claim 13, further comprising an alignment film on the overcoat layer, wherein
the first slit overlaps the alignment film, and
the second slit does not overlap the alignment film.

* * * * *